United States Patent
Oldenburg

(10) Patent No.: US 7,159,871 B2
(45) Date of Patent: Jan. 9, 2007

(54) RETROFITTABLE SEVERE DUTY SEAL FOR A SHAFT

(75) Inventor: Michael R. Oldenburg, Madelia, MN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/781,175

(22) Filed: Feb. 18, 2004

(65) Prior Publication Data

US 2004/0164495 A1 Aug. 26, 2004

Related U.S. Application Data

(63) Continuation of application No. 10/173,250, filed on Jun. 17, 2002, now Pat. No. 6,726,212, which is a continuation of application No. 09/690,524, filed on Oct. 17, 2000, now Pat. No. 6,406,026, which is a continuation of application No. 08/937,427, filed on Sep. 25, 1997, now Pat. No. 6,186,507.

(51) Int. Cl.
*F16J 15/32* (2006.01)
*F16J 15/34* (2006.01)

(52) U.S. Cl. .............. 277/353; 277/402; 277/407; 277/560; 277/565; 277/571

(58) Field of Classification Search ............. 277/353, 277/402, 407, 560, 565, 549
See application file for complete search history.

(56) References Cited

U.S. PATENT DOCUMENTS

| | | | |
|---|---|---|---|
| 3,022,081 A | 2/1962 | Kosatka | |
| 3,086,781 A | 4/1963 | Hudson et al. | |
| 3,144,558 A | 12/1963 | Rhoads et al. | |
| 3,135,518 A | 6/1964 | Carson et al. | |
| 3,356,376 A | 12/1967 | Bradfute et al. | |
| 3,572,732 A * | 3/1971 | Sekulich | ............. 277/570 |
| 3,606,351 A | 9/1971 | Hallerback | |
| 3,843,139 A | 10/1974 | Messenger | |
| 3,847,453 A | 11/1974 | Herbert | |
| 4,156,531 A | 5/1979 | Boucquey | |
| 4,277,072 A | 7/1981 | Forch | |

(Continued)

FOREIGN PATENT DOCUMENTS

EP  0 036 281 B1  7/1983

(Continued)

*Primary Examiner*—Vishal Patel
(74) *Attorney, Agent, or Firm*—Ronald W. Wangerow; Harness, Dickey & Pierce, P.L.C.

(57) ABSTRACT

A unitary sleeve lip seal can be used to provide permanently lubricated sealed bearings in severe service conditions such as the track pins of track-driven vehicles and agricultural equipment. The seal has a labyrinthine exclusion path and multiple dust lips contacting the sleeve in addition to the main sealing lip. A garter spring encircling the main sealing lip may enable the seal to operate at moderately elevated pressures. The sleeve has a radial flange at the outermost end. Elastomeric lips extend between the sleeve flange and a faceplate that terminates the outside end of the seal housing. The seal is packed with water-resistant grease and can, when installed in association with grease-packed bearings can create a permanently lubricated bearing/shaft assembly that requires no re-greasing. Resilient coatings both protect the sleeve and case and also improve leak resistance, especially when the seal is retrofitted onto shafts that have been damaged. The design provides a seal having performance that is comparable to that of dual cone face seals at a much lower cost and in a much smaller assembly. Seals made according to this design can easily be made in standard sizes that can serve as direct replacements for previously available seals.

45 Claims, 3 Drawing Sheets

U.S. PATENT DOCUMENTS

| | | | |
|---|---|---|---|
| 4,285,526 A | 8/1981 | Klinteberg et al. | |
| 4,418,919 A | 12/1983 | Wentworth | |
| 4,448,426 A | 5/1984 | Jackowski et al. | |
| 4,457,521 A | 7/1984 | Morley | |
| 4,491,332 A | 1/1985 | Zumbusch | |
| 4,497,495 A | 2/1985 | Christiansen | |
| 4,501,431 A | 2/1985 | Peisker et al. | |
| 4,513,976 A | 4/1985 | Bentley et al. | |
| 4,516,783 A | 5/1985 | Mitsue et al. | |
| 4,526,377 A | 7/1985 | Hale et al. | |
| 4,550,920 A | 11/1985 | Matsushima | |
| 4,552,367 A | 11/1985 | Fedorovich et al. | |
| 4,613,005 A | 9/1986 | Olsson | |
| 4,667,968 A | 5/1987 | Nash et al. | |
| 4,696,479 A | 9/1987 | Karcher | |
| 4,721,312 A | 1/1988 | Hornberger | |
| 4,808,012 A | 2/1989 | Otto | |
| 4,819,999 A | 4/1989 | Livesay et al. | |
| 4,856,794 A | 8/1989 | Boyers et al. | |
| 4,936,433 A | 6/1990 | Kyle | |
| 4,943,068 A | 7/1990 | Hatch et al. | |
| 5,004,248 A | 4/1991 | Messenger et al. | |
| 5,015,001 A | 5/1991 | Jay | |
| 5,028,054 A | 7/1991 | Peach | |
| 5,042,822 A | 8/1991 | Dreschmann et al. | |
| 5,096,207 A * | 3/1992 | Seeh et al. | 277/353 |
| 5,183,269 A | 2/1993 | Black et al. | |
| 5,201,529 A * | 4/1993 | Heinzen | 277/351 |
| 5,209,499 A | 5/1993 | Ruff, Jr. et al. | |
| 5,209,502 A | 5/1993 | Savoia | |
| 5,211,406 A | 5/1993 | Katzensteiner | |
| 5,299,811 A | 4/1994 | Kershaw | |
| 5,340,125 A | 8/1994 | Brown et al. | |
| 5,348,312 A | 9/1994 | Johnston | |
| 5,380,015 A | 1/1995 | Laflin et al. | |
| 5,470,157 A | 11/1995 | Dougherty et al. | |
| 5,480,161 A | 1/1996 | Borowski | |
| 5,503,408 A | 4/1996 | Hermann et al. | |
| 5,522,600 A | 6/1996 | Duckwall | |
| RE35,309 E | 8/1996 | Matsushima et al. | |
| 5,577,741 A | 11/1996 | Sink | |
| 5,582,412 A | 12/1996 | Sabo Filho | |
| 5,607,168 A | 3/1997 | Dahll | |
| 5,618,116 A * | 4/1997 | Ishikawa | 384/607 |
| 5,649,710 A * | 7/1997 | Kanda | 277/371 |
| 5,655,781 A | 8/1997 | Petrak | |
| 5,676,383 A | 10/1997 | Chandler | |
| 5,687,972 A | 11/1997 | Petrak | |
| 5,716,277 A | 2/1998 | Reynolds | |
| 5,836,700 A | 11/1998 | Wilkie, Jr. et al. | |
| 5,944,321 A | 8/1999 | Niebling et al. | |
| 5,975,538 A | 11/1999 | Krause et al. | |
| 6,050,572 A | 4/2000 | Balsells et al. | |
| 6,073,933 A | 6/2000 | Johnston | |
| 6,149,158 A | 11/2000 | Tripathy | |
| 6,168,165 B1 | 1/2001 | Sabo | |
| 6,170,833 B1 | 1/2001 | Cox et al. | |
| 6,186,507 B1 | 2/2001 | Oldenburg | |
| 6,199,869 B1 | 3/2001 | Furuyama et al. | |
| 6,220,600 B1 | 4/2001 | Tripathy et al. | |
| 6,257,587 B1 | 7/2001 | Toth et al. | |
| 6,357,751 B1 | 3/2002 | Rentschler | |
| 6,406,026 B1 | 6/2002 | Oldenburg | |
| 6,450,503 B1 | 9/2002 | Dossena et al. | |

FOREIGN PATENT DOCUMENTS

| | | |
|---|---|---|
| EP | 0 086 002 A1 | 8/1983 |
| EP | 0 091 983 A1 | 10/1983 |
| EP | 0 128 241 A2 | 12/1984 |
| EP | 0 172 348 A1 | 2/1986 |
| EP | 0 213 652 A1 | 3/1987 |
| EP | 0 230 120 A1 | 7/1987 |
| EP | 0 260 441 A2 | 3/1988 |
| EP | 0 172 881 B1 | 9/1988 |
| EP | 0 281 452 A1 | 9/1988 |
| EP | 0 301 731 A2 | 2/1989 |
| EP | 0 303 359 A1 | 2/1989 |
| EP | 0 304 160 A1 | 2/1989 |
| EP | 0 337 893 A1 | 10/1989 |
| EP | 0 385 635 A2 | 9/1990 |
| EP | 0 394 025 A1 | 10/1990 |
| EP | 0 385 635 A3 | 4/1991 |
| EP | 0 420 212 A2 | 4/1991 |
| EP | 0 427 553 A1 | 5/1991 |
| EP | 0 454 193 A1 | 10/1991 |
| EP | 0 474 950 A1 | 3/1992 |
| EP | 0 253 839 B1 | 4/1992 |
| EP | 0 505 793 A1 | 9/1992 |
| EP | 0 420 212 A3 | 12/1992 |
| EP | 0 525 288 A1 | 2/1993 |
| EP | 0 556 494 A1 | 8/1993 |
| EP | 0 562 160 A1 | 9/1993 |
| EP | 0 571 284 A1 | 11/1993 |
| EP | 0 596 196 A2 | 5/1994 |
| EP | 0 611 904 A1 | 8/1994 |
| EP | 0 516 708 B1 | 12/1994 |
| EP | 0 631 072 A1 | 12/1994 |
| EP | 0 596 196 A3 | 6/1995 |
| EP | 0 736 711 A1 | 10/1996 |
| EP | 0 744 567 A1 | 11/1996 |
| EP | 0 789 152 A2 | 8/1997 |
| EP | 0 798 498 A1 | 10/1997 |
| EP | 0 814 288 A1 | 12/1997 |
| EP | 0 789 152 A3 | 4/1998 |
| EP | 0 843 114 A2 | 5/1998 |
| EP | 0 846 900 A1 | 6/1998 |
| EP | 0 864 770 A1 | 9/1998 |
| EP | 0 913 605 A2 | 5/1999 |
| EP | 0 921 334 A1 | 6/1999 |
| EP | 0 843 114 A3 | 7/1999 |
| EP | 0 940 609 A2 | 9/1999 |
| EP | 0 945 656 A2 | 9/1999 |
| EP | 0 670 976 B1 | 11/1999 |
| EP | 0 945 656 A3 | 2/2000 |
| EP | 0 913 605 A3 | 5/2000 |
| EP | 0 999 364 A2 | 5/2000 |
| EP | 0 999 388 A1 | 5/2000 |
| EP | 1 016 800 A2 | 7/2000 |
| EP | 1 024 318 A2 | 8/2000 |
| EP | 1 050 700 A2 | 11/2000 |
| EP | 1 055 849 A2 | 11/2000 |
| EP | 0 999 364 A3 | 2/2001 |
| EP | 1 016 800 A3 | 2/2001 |
| EP | 1 024 318 A3 | 4/2001 |
| EP | 1 096 184 A2 | 5/2001 |
| EP | 1 106 878 A2 | 6/2001 |
| EP | 1 050 700 A3 | 11/2001 |
| EP | 1 164 319 A2 | 12/2001 |
| EP | 1 182 133 A1 | 2/2002 |
| EP | 1 106 878 A3 | 3/2002 |
| EP | 1 055 849 A3 | 4/2002 |
| EP | 1 201 975 A2 | 5/2002 |
| EP | 1 231 418 A2 | 8/2002 |
| EP | 1 245 874 A2 | 10/2002 |
| JP | 53-099156 | 8/1978 |
| JP | 54-132050 | 10/1979 |
| JP | 54-158556 | 12/1979 |
| JP | 55-082857 | 6/1980 |
| JP | 56-105157 | 8/1981 |
| JP | 56-138566 | 10/1981 |
| JP | 58-068552 | 4/1983 |
| JP | 59-126162 | 7/1984 |
| JP | 59-126164 | 7/1984 |

| | | | | | | |
|---|---|---|---|---|---|---|
| JP | 60-139970 | 7/1985 | | JP | 11-248004 | 9/1999 |
| JP | 60-245874 | 12/1985 | | JP | 11-344128 | 12/1999 |
| JP | 62-037571 | 2/1987 | | JP | 2000-065217 | 3/2000 |
| JP | 62-258266 | 11/1987 | | JP | 2000-193096 | 7/2000 |
| JP | 63-071583 | 3/1988 | | JP | 2000-297757 | 10/2000 |
| JP | 63-239314 | 10/1988 | | JP | 2000-346203 | 12/2000 |
| JP | 2-102974 | 4/1990 | | JP | 2001-050287 | 2/2001 |
| JP | 03-010993 | 1/1991 | | JP | 2001-065703 | 3/2001 |
| JP | 03-020175 | 1/1991 | | JP | 2001-074143 | 3/2001 |
| JP | 03020175 A | 1/1991 | | JP | 2001074143 A | 3/2001 |
| JP | 03-260478 | 11/1991 | | JP | 2001-124214 | 5/2001 |
| JP | 03-265765 | 11/1991 | | JP | 2001-125374 | 5/2001 |
| JP | 03260478 A | 11/1991 | | JP | 2001-183955 | 7/2001 |
| JP | 04-203658 | 7/1992 | | JP | 2001-263500 | 9/2001 |
| JP | 05-223174 | 8/1993 | | JP | 2001263500 A | 9/2001 |
| JP | 06-201054 | 7/1994 | | JP | 2001-317635 | 11/2001 |
| JP | 06-300141 | 10/1994 | | JP | 2001-329984 | 11/2001 |
| JP | 07-042848 | 2/1995 | | JP | 2001317635 A | 11/2001 |
| JP | 07-071612 | 3/1995 | | JP | 2001329984 A | 11/2001 |
| JP | 07-174238 | 7/1995 | | JP | 2001-349442 | 12/2001 |
| JP | 07-291186 | 11/1995 | | JP | 2001-355645 | 12/2001 |
| JP | 07-332377 | 12/1995 | | JP | 2002-048147 | 2/2002 |
| JP | 08-004776 | 1/1996 | | JP | 2002-048246 | 2/2002 |
| JP | 08-190268 | 7/1996 | | JP | 2002-115667 | 4/2002 |
| JP | 08-254213 | 10/1996 | | JP | 2002-115668 | 4/2002 |
| JP | 08-296743 | 11/1996 | | JP | 2002-115762 | 4/2002 |
| JP | 08-338534 | 12/1996 | | JP | 2002-122086 | 4/2002 |
| JP | 08338534 A | 12/1996 | | JP | 2002-122087 | 4/2002 |
| JP | 09-088886 | 3/1997 | | JP | 2002122087 A | 4/2002 |
| JP | 09-268981 | 10/1997 | | JP | 2002-130306 | 5/2002 |
| JP | 10-003212 | 1/1998 | | JP | 2002-139058 | 5/2002 |
| JP | 10-009401 | 1/1998 | | JP | 2002-206549 | 7/2002 |
| JP | 10-169787 | 6/1998 | | JP | 2002-228008 | 8/2002 |
| JP | 10-220590 | 8/1998 | | JP | 2002-228009 A | 8/2002 |
| JP | 10-331984 | 12/1998 | | JP | 2002228009 A | 8/2002 |
| JP | 11-013893 | 1/1999 | | JP | 2002-276816 | 9/2002 |
| JP | 11-173239 | 6/1999 | | JP | 2002276816 A | 9/2002 |
| JP | 11-210684 | 8/1999 | | WO | WO 85/03558 | 8/1985 |
| JP | 11-218095 | 8/1999 | | WO | WO 01/90610 A1 | 11/2001 |
| JP | 11-223198 | 8/1999 | | | | |
| JP | 11223198 A | 8/1999 | | * cited by examiner | | | ns
RETROFITTABLE SEVERE DUTY SEAL FOR A SHAFT

PRIORITY

This application is a continuation of U.S. application Ser. No. 10/173,250, filed Jun. 17, 2002, now U.S. Pat. No. 6,726,212 issued Apr. 27, 2004, which is a continuation of U.S. application Ser. No. 09/690,524, filed Oct. 17, 2000, now U.S. Pat. No. 6,406,026, issued Jul. 18, 2002, which is a continuation of U.S. application Ser. No. 08/937,427, filed Sep. 25, 1997, now U.S. Pat. No. 6,186,507, issued Feb. 13, 2001, all of which are incorporated herein by reference in their entirety.

TECHNICAL FIELD

The present disclosure is related to the field of seals for sealing rotary shafts, generally. The methods and apparatus are particularly related to the field of unitary combination lip and sleeve seals. More specifically, this is an improved seal adapted for use in severe duty applications including construction equipment, agricultural machinery, track driven vehicles, and other applications where oil or grease must be held in contact with rotary shaft and bearing assemblies. This seal and other seals of this type must also operate as excluder seals to keep lubricated surfaces free from corrosives, acids, other chemicals, dirt, mud, dust, abrasives, water and other contaminants. Even more particularly, this seal incorporates design features that enhance performance (compared to usual original equipment seals) when installed on shafts that have been slightly damaged by normal wear.

BACKGROUND AND SUMMARY

The present seal structure yields a very important benefit that has eluded other persons skilled in the art. It can be retrofitted to existing, worn machinery to enhance the protection of costly lubricated machine components. This seal can replace existing seals, and the performance of this seal exceeds that of all other standard-sized, commercially available, conventional, lip and sleeve type seals. The only commercially available type of seal with performance comparable to this embodiment is the dual cone face seal. It is known by those in the art that dual cone face shields have disadvantages that significantly restrict their use. The seal disclosed here overcomes the two major inherent disadvantages of dual cone face seals—large size and high cost.

Conventional unitized lip and sleeve seals are much smaller than dual cone face seals. Since this seal can be installed as a direct replacement for ordinary seals, it can be specified and used without making any modifications to the design of a machine. The shaft, the bore, and the housing in which the seal operates are identical whether the present seal or conventional seals are used. Wherever dual cone face seals are desired, the machine must have been originally designed specifically for their use because they are much larger than ordinary seals. They are simply too big to fit all of the machine locations where their superior performance could justify the significant added cost.

The cost of making this seal is only a fraction of the cost of making a dual cone face seal. The additional cost can be substantial because the manufacturing cost for a dual cone face seal is currently between twenty and ninety times the cost of a conventional seal. A preferred embodiment of the present disclosure is expected to be two to three times the cost of a conventional seal.

The most important benefit of the seal now disclosed is that it can create permanently lubricated shaft and bearing assemblies that can withstand severe use. This seal may enable equipment manufacturers to improve the performance of their machinery by reducing maintenance requirements. It is believed that existing vehicles and other machines can be retrofitted advantageously by replacing the original re-greasable seals with this new permanently lubricated seal.

It is an object of the invention to accomplish the foregoing and to teach the structure of a retrofittable severe duty seal for a shaft.

It is a further object of this disclosure to show an embodiment that may be used to seal rotary shafts used in track-driven vehicle tracks.

Another object is to provide an embodiment that may be useful in any application where a shaft and shaft bearing or bushing surfaces may be exposed to mud, dust, abrasives, cement, submersion, abrasive liquids or other substances that could damage relative rotary mechanical components.

Another object hereof to disclose a seal that lasts longer than previously known low cost seals that are adapted for use in severe duty applications.

Another object of the present disclosure is to make essentially all of the important benefits of a dual cone face seal available at a much lower cost.

Another object of the present disclosure is to make essentially all of the important benefits of a dual cone face seal available in a physically smaller assembly.

Another object of the present disclosure is to make essentially all of the important benefits of a dual cone face seal available in an assembly having the same physical dimensions as a conventional single lip or double lip seal.

Another object hereof is to provide an embodiment that can function as an excluder seal, as a grease seal, as an oil seal, and as a seal for other liquids at low and moderate pressures.

Another object of this disclosure is to provide a seal having a shaft-contacting sleeve that enables the seal to be installed on and to operate reliably with shafts having imperfections such as those ordinarily caused by wear and use.

Another object hereof is to provide a seal that is unitary in structure to thereby improve reliability, and to make installation of the seal easier that would be the installation of a seal that is comprised of two or more separable parts.

Another object is to provide a permanently lubricated seal for the track pins of a track-driven vehicle.

A further object is to provide a seal with sealing elements that include: a main sealing lip with a garter spring, three dust lips that contact the sleeve, one dust lip that contacts the inner surface of the housing, two face dust lips that contact the inner surface of the faceplate, and an elastomeric shaft-contacting faceplate ring.

These and further objects of the apparatus taught in accordance with this specification, the claims, and the appended drawing figures are set forth below.

DISCLOSURE OF THE INVENTION

The present disclosure shows a retrofittable radial lip seal for a circular rotatable shaft comprising a sleeve that may be disposed coaxially around the shaft. The sleeve has an inner end that would normally be in contact with the grease, oil, or other fluid to be contained within a housing, an outer end that would normally be exposed to ambient conditions, a bore that has an elastomeric coating, and a sleeve flange extending radially outward from the outer end of the sleeve and generally perpendicular to the sleeve axis. The sleeve flange is terminated with an outer edge. One or more circular elastomeric face lips extend coaxially from the sleeve flange outer face.

A circular elastomeric perimeter lip extends radially and outwardly from the outer edge of the sleeve flange to contact a generally cylindrical hollow seal case adapted for fitting into a bore, such as a bore that is formed through the wall of a housing, or other securement.

The case is formed from a generally cylindrical case body having an outside surface, or outside diameter, that may be disposed within a bore and in contact with the wall of the bore. An elastomeric coating may be affixed to the outside of the case body. By coating the outside of the metal case body with an elastomeric coating or layer, it is possible for the seal to securely fit a bore that may be worn or slightly damaged through use.

The inner surface of the case is smoothly finished in the region close to the outer end so that it is adapted for maintaining continuous operating contact with the perimeter lip of the sleeve flange. The case has an inner, fluid-contacting end, opposite the outer end. A case skirt extends radially outward from, and generally perpendicular to, the outside end of the case. Although it is believed preferable to form the case skirt from the case body, it may be possible to form the case skirt by attaching a separate piece. A case inner flange is located between the outer end and the fluid end of the case.

The case inner flange extends radially inwardly from, and generally perpendicular to, the longitudinal axis of the inside of the case. It is believed preferable to draw the case inner flange from the material of the case body. When formed in that manner, the material of the case body is doubled back on itself to yield two thicknesses of the case material for the distance between the case inner end and the case inner flange. The case reinforcement provided by the double layer of metal makes allows the use of a slightly thinner material to form the case body than would be necessary if the case material was a single thickness. However, other methods of construction may be adopted without departing from the scope of the invention disclosed. For instance, case inner flange could be formed from a cup-shaped blank that is inserted into the case body and secured in place.

At least one sleeve-contacting, elastomeric, main sealing lip extends from the case inner flange to operatively contact the outer surface of the sleeve at a region near the inner end of the sleeve. The main sealing lip may be fitted with a garter spring to enable the assembly to operate at higher pressures. Testing has confirmed that the seal disclosed herein can operate reliably at a pressure of one atmosphere (15 p.s.i.) with shaft speeds of 700 feet per minute.

The maximum pressure at which this seal, like seals in general, can reliably operate decreases with increasing shaft speed. Testing may show that operation is satisfactory at pressures of approximately 100 p.s.i. or that slight changes could allow the seal to operate in the range of 100 p.s.i. Testing at higher these pressures and rotational velocities has not been concluded at the present time.

The main sealing lip and garter spring portion extends inwardly, toward the inner end of the sleeve, coaxially with the sleeve. At least one, and preferably two, dust lips are positioned to extend inwardly from the case into coaxial contact with the sleeve outer surface. One of the inwardly oriented dust lips, the mid-sleeve dust lip, may be disposed generally between the case inner flange aperture and the sleeve outer surface. The second sleeve contacting dust lip, the forward sleeve dust lip, is disposed generally midway between sleeve flange and the case inner flange. A third dust lip, the case flange dust lip, extends forwardly from the front surface of the case inner flange. The three dust lips and the main sealing lip are molded at high temperatures in one piece using a single mold operation and bonded to the case with suitable bonding agents. A resilient layer may cover the outside of the case to improve sealing in conditions where soft, damaged, or other less than optimal bore conditions exist that would impair reliable sealing with a steel outer case surface. When the outer surface of the case is provided with such a rubberized covering, it is normally formed unitarily with the sleeve dust lips and the sealing lip. It is possible to cover the rearward surface of the case inner flange in the same operation with the same rubberized resilient compound. In applications that might expose the sealed materials to corrosion, it is preferred to cover with resilient rubberized material all of the portions of the seal case that are likely to contact the corrosive agents.

The case elastomeric coating is formed with a chamfer to minimize the likelihood that the seal will be damaged during installation. A case relief channel is also formed in the case elastomeric coating adjacent the case skirt. The relief channel relieves the tendency of the elastomeric coating to form a bulge at the edge of the bore that could cause the seal to become unseated and move axially after installation. It is also possible to provide radial ribs on the outer surface of the case elastomeric coating for the purpose of providing desired installation properties.

The seal is made into a unitary structure by inserting the sleeve inner end through the case inner flange so that the sleeve flange is inside the case near the case skirt. All of the voids between the lips, and the voids between the lips and the case, must be packed with grease before final assembly of the seal. The faceplate is then attached to the case skirt thereby retaining the sleeve within the case portion. It has been found that a high quality water-resistant grease is needed. One satisfactory grease is made by Esso Corporation and sold under the trade name "BEACON 325" although other products may also serve quite satisfactorily. The faceplate is attached to the case skirt and disposed in contact with the face lips that extend axially from the face of the sleeve flange and packed with grease. Although it is believed preferable to attach the faceplate to the case by crimping the peripheral edge of the faceplate around the outer edge of the case skirt, the faceplate may also be attached to the skirt by welding, brazing, adhesive bonding, or by any other of the usual means of connecting such items. It is desired that the junction between the case skirt and the faceplate be impervious to external contaminants and internal lubricants at the temperatures, pressures, and other conditions in which the seal is operated.

A generally planar circular faceplate has an inside surface, an outside surface, and a central aperture slightly larger than the inside diameter of the sleeve. The plane of the inner faceplate surface is disposed generally parallel to the case skirt and the face of the sleeve flange. An elastomeric portion, or faceplate wiper ring, can be attached to the faceplate at the central aperture so that the faceplate wiper ring extends between the faceplate and the shaft. The faceplate wiper ring has an internal diameter that allows it to contact the shaft and thereby exclude contaminants from the remainder of the seal and the sealed components.

The sleeve bore is preferably coated with an elastomeric, or rubberized, coating to make it possible to obtain adequate sealing performance when the shaft condition is substandard due to wear, eccentricity, or other causes. A sleeve radial channel may be formed generally midway between the sleeve inner end and the sleeve outer end. The channel relieves shear tension that develops during installation. The result is that it is easier to install the sleeve and the potential for damage to the sleeve during installation is reduced.

Chamfers are provided at both the inner end and at the outer end of the sleeve bore to make installation less likely to damage the seal, the shaft, or the housing. In addition, the inner end of the sleeve outer surface is chamfered to make insertion of the sleeve through the housing easier and less likely to damage the dust lips or other components. The case inner end of the case outside surface is chamfered to make installation of the case within the housing easier.

The flange peripheral lip and face lips may be formed in the same molding operation that is used to mold the sleeve bore elastomeric coating. The design of the face lips may be designed with shapes similar to those of the peripheral lip and the three dust lips. However, an alternative design for the face lips is disclosed herein. The undercut face lips are adapted to provide superior performance in severe duty operating conditions. The advantage accrues because the undercut lip inside surface responds with increasing pressure in response to contact with materials that would penetrate the seal. The other lips contact the mating seal surface at distinctly different approach angles and with quite different elastomer shapes and configurations.

An alternative form of main sealing lip is favored for some very dirty applications, such as in agricultural machinery. In the alternate embodiment, the main sealing lip and garter spring are replaced by a triple radial wiper set, or triple flat lip. In addition, the two sleeve contacting dust lips may also be eliminated in this alternative embodiment. The triple flat lip design may be less susceptible to catastrophic damage by the infiltration of small amounts of foreign materials than are the usual main seal lip and garter spring sets. It is also possible to produce the design with more or fewer lips; for example, a quadruple lip design may be desired in some applications.

It is preferred to have the inner, or skirt-contacting, side of the faceplate smoothly finished to reduce wear on the face lips of the seal. Likewise, the outer surface of the sleeve, the sleeve flange inner face, and the perimeter lip-contacting case inner surface may be finished to a condition of low surface roughness to reduce the amount of wear to which the various elastomeric seal lips are subjected. For this reason, it is generally preferred to make the sleeve, case, and faceplate of metal such as stainless steel, carbon steel, or similar materials. It is to be understood, however that the sleeve, case, and faceplate may be made from other metals and also from non-metallic materials.

In seals of this nature, the seals are normally described by reference to the cross-sectional configuration. The seal of the present embodiment may readily be manufactured in sizes between 0.5 inches and 26 inches with other sizes available on request. By way of example only and without any limitation on the configuration of embodiments of this disclosure, a representative seal may have an inside (shaft) diameter of 3⅛", an outside (bore) diameter of 4⅛", and a faceplate diameter of 4⅜" with an overall width of about ½". The various dimensions do not scale proportionately. For example, the same type of seal may be manufactured for a 6¼" shaft diameter but still have an overall width of ½" and be designed to fit into a 7¾" bore. Seals adapted to various purposes may vary in width from less than ⅛" to over 1" but generally have a width between ¼" and ¾".

It is to be understood, as well, that many different formulations of the elastomeric, or rubberized, elements may function satisfactorily. Viton®, nitrite, carboxylated nitrite, polyacrylate, ACM, fluroelastomers, and silicone compounds are known to provide useful operational characteristics when adapted for incorporation within the seal presently disclosed. Other materials may also be incorporated to confer chemical resistance, extreme temperature resistance, expanded operating pressure range, wear resistance, or other desired properties to the final seal assembly.

DESCRIPTION OF THE PREFERRED EMBODIMENTS

Figure 1:
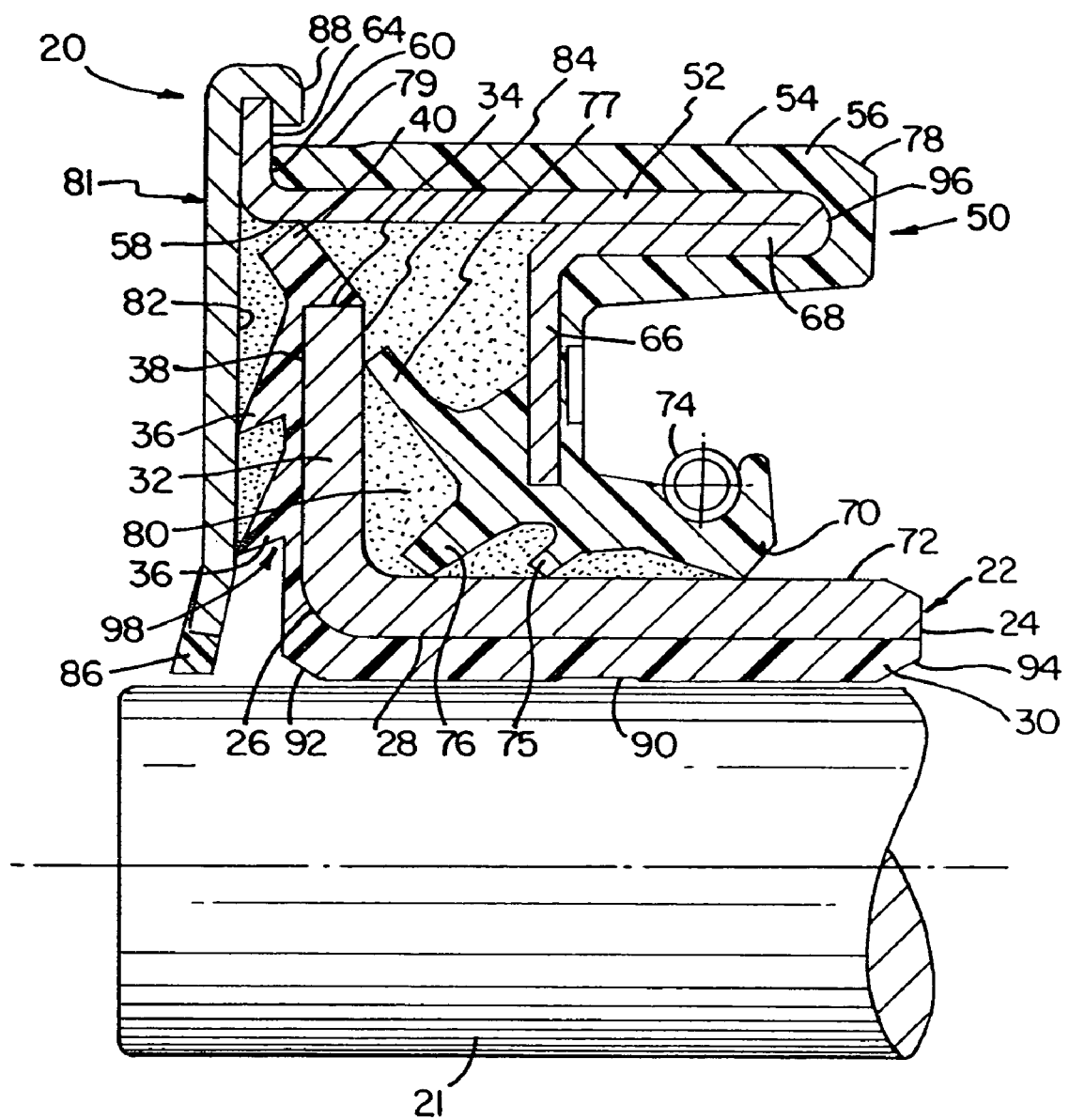
FIG. 1 shows a cross-sectional profile of the structure of an embodiment according to the present disclosure.

Referring now to the various figures of the accompanying drawing, FIG. 1 depicts a cross-sectional profile of an embodiment of the retrofittable severe duty seal 20 fitted onto a shaft 21. A cylindrical sleeve 22 is disposed coaxially over the shaft. The sleeve inner end 24 extends into the sealed region, normally a housing or containment for oil or grease for lubricating gears or bearings. To simplify nomenclature in this specification, the side or end or surface of a component that is oriented toward the lubricants, lubricated components, or other media from which it is desired to exclude dust, water, mud, and other environmental contaminants may be referred to using the terms "inner," "inward," "inside," and similar terms. The words "outer," "outward," "outside" and similar terms may be used to refer to the side, or end or surface of a component that is oriented away from the sealed region, toward the exterior of a housing, or toward the unsealed overall environment into which a shaft extends.

Between the sleeve inner end 24 and the sleeve outer end 26, the sleeve bore 28 may be coated with an elastomeric coating 30. The optional sleeve bore elastomeric coating 30 is desirable because it may prevent leakage from between the seal 20 and the shaft 21 even when the shaft is worn or damaged. The sleeve flange 32 extends radially outwardly from the sleeve outer end 26. The sleeve flange 32 has a sleeve flange outer edge 34 at its outer periphery. At least one, and preferably two, face lips 36 extend coaxially outwardly from the sleeve flange outer face 38 and a perimeter lip 40 extends radially outwardly from the sleeve flange outer edge 34. The sleeve bore elastomeric coating 30, the face lips 36, and the perimeter lip 40 may be integrally formed and bonded to the sleeve 22 in a single injection molding operation.

A seal case 50 is disposed coaxially outside the sleeve 22. The seal case 50 has a generally cylindrical case body 52 designed so that the case outside surface 54 can fit into and seal against a bore in a housing or flange through which the shaft 21 to be sealed extends. It is preferred to enclose the case outside surface 54 with an optional case elastomeric coating 56. The seal 20 is less likely to leak when installed in a damaged bore if the optional case elastomeric coating 56 is provided. The case body 52 has a smoothly finished perimeter lip-contacting case inner surface 58 in the region near the case outer end 60.

The case inner end 62 is axially opposite the case outer end 60 and the case skirt 64 that extends radially outwardly from the case outer end 60.

A case inner flange 66 extends radially inwardly from the case body 52 toward the sleeve 22. The case inner flange 66 has a circular central aperture through which the shaft 21 and sleeve 22 fit. When the case inner flange 66 is drawn or otherwise made from the case body 52 it is possible to simultaneously form a case reinforcement 68 with a double layer of the material from which the case body 52 is made.

The main sealing lip 70 attaches to the case inner flange 66 and extends both axially inwardly and radially inward from the case inner flange 66. The main sealing lip 70 contacts the sleeve outer surface 72 to form the primary sealing element by which the contents (generally fluids) of the sealed volume are prevented from transferring to the outside of the assembly. The main sealing lip 70 is optionally biased against the sleeve outer surface 72 by a garter spring 74. The sleeve outer surface 72 may be polished or otherwise finished to reduce wear of the main sealing lip 70.

Additional sealing elements are situated axially outwardly from the main sealing lip 70. These additional dust lips may extend between the case body 52, particularly the case inner flange 66, and the sleeve outer surface 72. A midsleeve dust lip 75 may be located generally between the case inner flange 66 and the sleeve outer surface 72. A forward sleeve dust lip 76 may be disposed against the sleeve outer surface 72 at a location close to the sleeve flange 32. A case flange dust lip 77 may extend from the case inner flange 66 to contact the sleeve flange 32. The case elastomeric coating 56, the main sealing lip 70, the mid-sleeve dust lip 75, the forward sleeve dust lip 76 and the case flange dust lip 77 may be integrally formed and bonded to the case body 52 and case inner flange 66 in a single injection molding operation.

On the inner end of the case body 52, the case elastomeric coating 56 is finished with a case elastomeric coating chamfer 78 to make it easier to install the seal 20 without distortion or damage. A case outside diameter relief channel 79 is formed in the case elastomeric coating 56 adjacent the case skirt 64. The relief channel 79 relieves axial shear stresses from the case elastomeric coating 56 that may be induced by the process of installing the seal 20 into a bore.

Three main sub-assemblies, the sleeve 22, the case 50, and the faceplate 81 are interconnected to form a complete seal 20. These three sub-assemblies are normally made primarily of steel or another metal that is shaped, worked, and polished using conventional metalworking techniques and commercially available equipment. It may be advantageous to smooth the metal surfaces that are contacted by the various elastomeric components to obtain a metal finish having low surface roughness. Carefully shaped and molded elastomeric compounds are bonded to the metal components in the configurations shown in the accompanying drawing. It is possible to form the elastomeric components and attach them to the metal structures in a variety of ways; however, injection molding is believed preferable for these purposes.

Final assembly of the seal 20 is performed by carrying out four additional steps. First, water-resistant grease 80, such as Esso Beacon 325™ is packed to fill all of the voids between the lips and between the case inner flange 66 and the case skirt 64. Second, the sleeve 22 is inserted into the seal case 50 so that the case flange dust lip 77 contacts the sleeve flange 32 and the perimeter lip 40 contacts the perimeter lip-contacting case inner surface 58. Third, grease 80 is packed into the interstices between the individual face lips 36 and also between the perimeter lip 40 and the outermost of the face lips 36. Fourth, the faceplate 81 is affixed to the case skirt 64 by crimping or other means to complete the assembly and unitizing process.

After the faceplate 81 is attached to the case skirt 64, the faceplate inner side 82 contacts the face lips 36 and the sleeve flange inner face 84 is brought into contact with the case flange dust lip 77.

An optional elastomeric faceplate wiper ring 86 can be bonded to a central aperture in the faceplate 81 coaxial with, and through which, the shaft 21 extends. The periphery of the faceplate 81 may be finished with a peripheral faceplate crimp edge 88 for crimping over the case skirt 64 when the faceplate 81 is attached by crimping.

A sleeve radial channel 90 is preferably formed within the sleeve bore elastomeric coating 30 to relieve shear as the sleeve 20 is fitted to a shaft. The sleeve 22 is finished with a sleeve outer end chamfer 92 and a sleeve inner end chamfer 94 to reduce the potential for tearing of the sleeve bore elastomeric coating 30 and for distortion of the sleeve 22 during installation of the seal 20. Likewise, the seal case 50 may be fitted with a case inner end chamfer 96 to reduce damage to the case elastomeric coating 56 when the case is fitted with elastomeric coating and to prevent case distortion in embodiments without case elastomeric coating 56.

It is believed preferable for the face lips 36 to be sharply angled radially inwardly with an acute point at the innermost portion of each of the face lips 36. In order to form a lip having such a shape, it may be necessary to include a face lip undercut angle 98 that is less than 90 degrees to obtain the desired performance characteristics. The face lips 36 may be formed having a generally cross-section.

Figure 2:
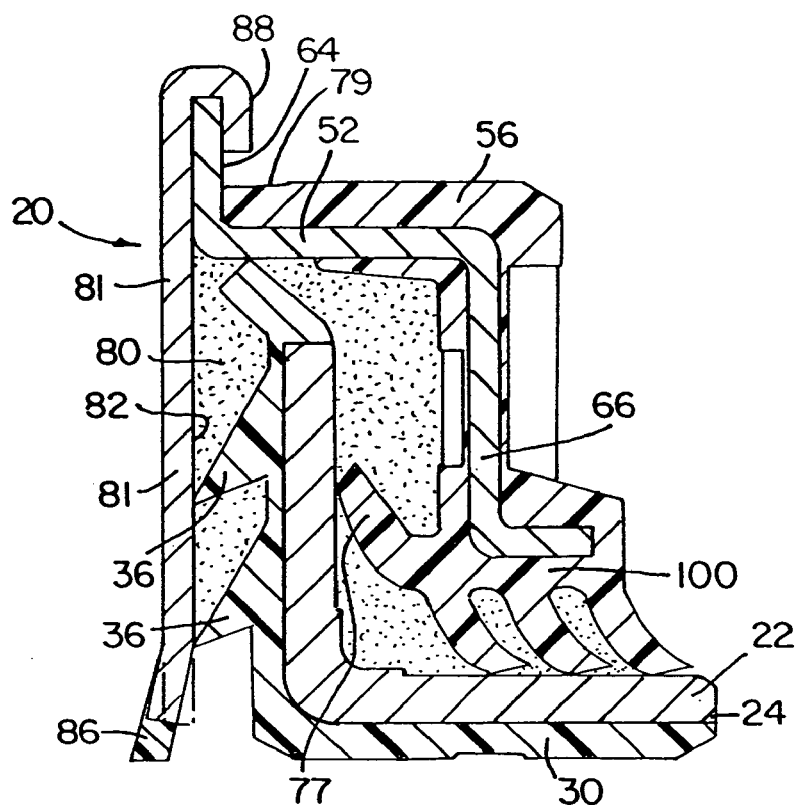
FIG. 2 shows a cross-sectional profile of the structure of an alternative embodiment of the embodiment of FIG. 1 having an alternative configuration for the main sealing lip.

FIG. 2 shows an embodiment wherein the single main sealing lip 70 shown in FIG. 1 is replaced with a triple lip main seal 100. It may be desirable to also eliminate the mid-sleeve dust lip 75 and the forward sleeve dust lip 76 from embodiments having the main sealing lip 70 replaced by the triple lip main seal 100.

Figure 3:
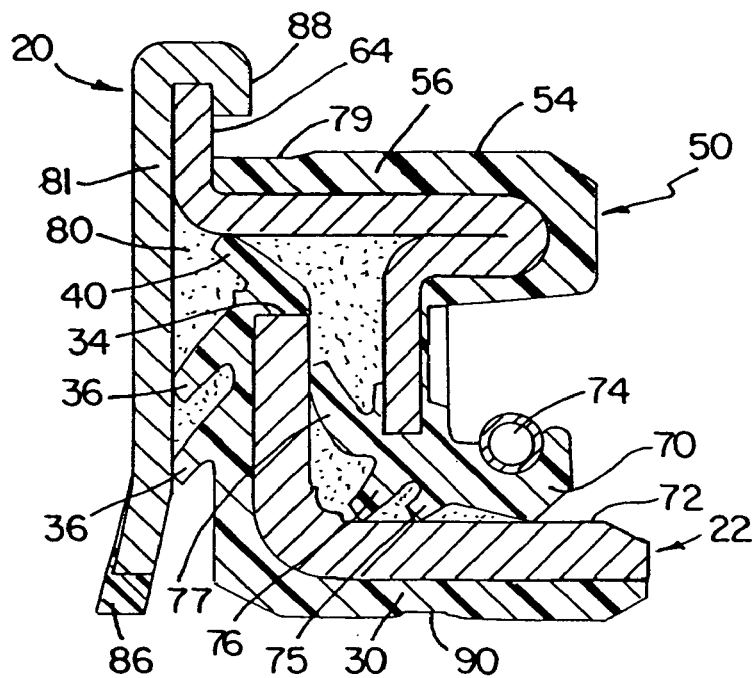
FIG. 3 shows an alternative configuration of the seal of FIG. 1 with an alternative shape for the face lips.

FIG. 3 shows an embodiment of the seal 20 wherein the spacing relationship between the dust lips 75 76 77 is modified slightly from the relationship depicted in FIG. 1.

Figure 4:
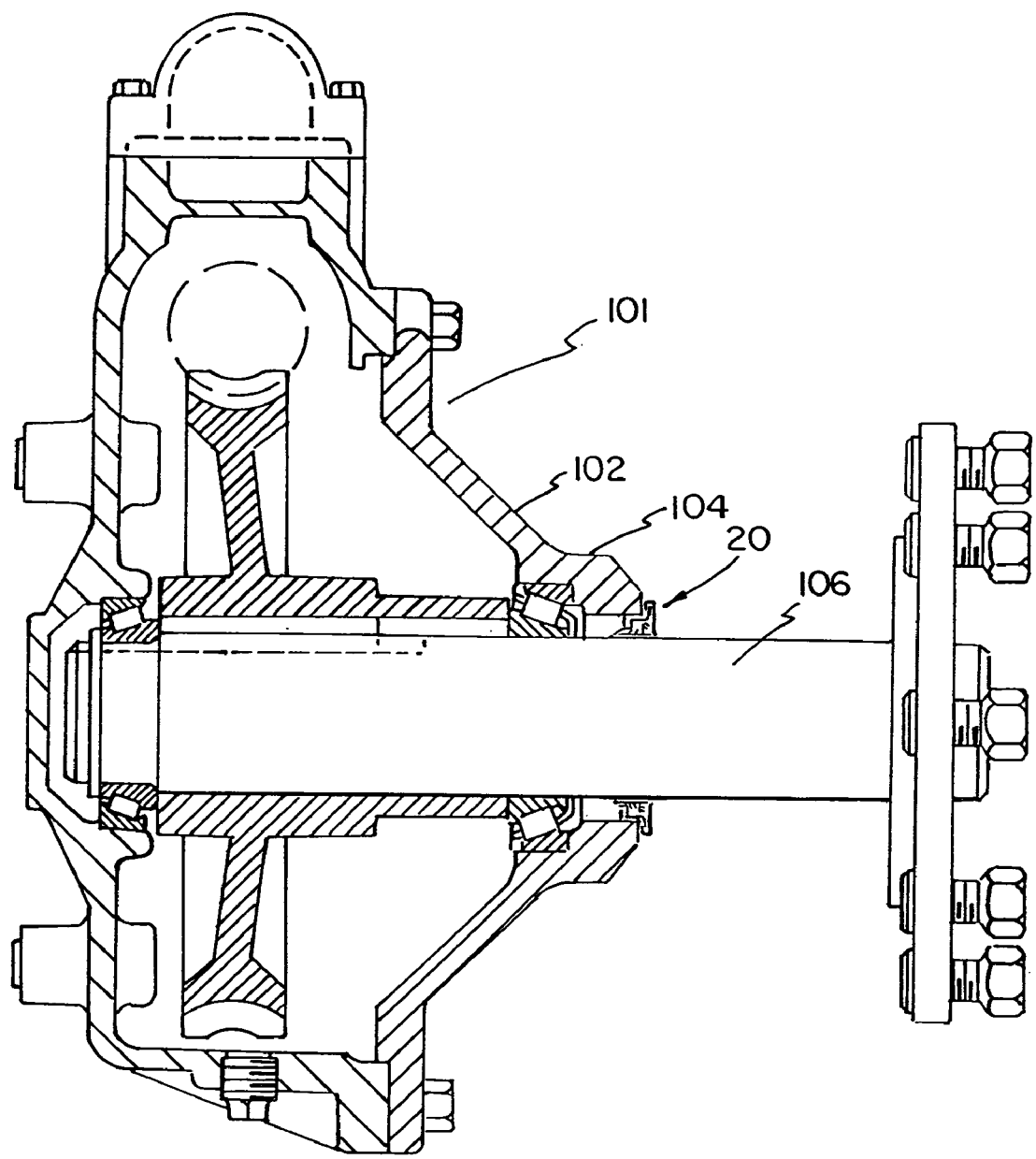
FIG. 4 shows a representative assembly of a type that is adapted for receiving the retrofittable seal of FIG. 1.

FIG. 4 shows a representative application in which the seal 20 may be installed, specifically, a worm gear drive assembly 101. The seal 20 is fitted into the bore of a housing 102 to seal a bearing 104 from outside contaminants and to prevent lubricants from leaking out of the housing 102 around the output shaft 106 of the worm gear drive assembly 101.

INDUSTRIAL APPLICABILITY

From the foregoing, it may be readily understood by those skilled in the art that the embodiments disclosed are applicable to industry and mechanical power transmission generally, and to machinery and vehicles that are operated in severe environments, particularly. Incorporation of the present embodiment into new and existing equipment is expected to substantially reduce the maintenance requirements of many types of construction and agricultural equipment.

Changes and modifications in the specifically described embodiments can be carried out without departing from the scope of the invention which is intended to be limited only by the scope of the appended claims.

| REFERENCES TO DRAWING NUMBERS |
| --- |
| 20 Retrofittable Severe Duty Seal for a Shaft |
| 21 shaft (reduced scale) |
| 22 sleeve |
| 24 sleeve inner end |
| 26 sleeve outer end |
| 28 sleeve bore |
| 30 sleeve bore elastomeric coating |
| 32 sleeve flange |
| 34 sleeve flange outer end |
| 36 face lips |
| 38 sleeve flange outer face |
| 40 perimeter lip |
| 50 seal case |
| 52 case body |
| 54 case outside surface |
| 56 case elastomeric coating |
| 58 perimeter lip-contacting case inner surface |
| 60 case outer end |
| 62 case inner end |
| 64 case skirt |
| 66 case inner flange |
| 68 case reinforcement |
| 70 main sealing lip |
| 72 sleeve outer surface |
| 74 garter spring |
| 75 mid-sleeve dust lip |
| 76 forward sleeve dust lip |
| 77 case flange dust lip |
| 78 case elastomeric coating chamfer |
| 79 case outside diameter relief channel |
| 80 grease |
| 81 faceplate |
| 82 faceplate inner side |
| 84 sleeve flange inner face |
| 86 elastomeric faceplate wiper ring |
| 88 peripheral faceplate crimp edge |
| 90 sleeve radial channel |
| 92 sleeve outer end chamfer |
| 94 sleeve inner end chamfer |
| 96 case inner end chamfer |
| 98 face lip undercut angle |
| 100 triple lip main seal |
| 101 worm gear drive assembly |
| 102 housing |
| 104 bearing |
| 106 worm gear drive output shaft |

I claim:

1. A seal for sealing a shaft, the seal comprising:

a sleeve constructed to be disposed generally coaxially around the shaft and comprising a parallel sleeve portion that is generally parallel to the longitudinal axis of the shaft and a radially extending sleeve portion that extends generally radially away from the longitudinal axis of the shaft;

an outer housing configured to generally surround the sleeve and comprising a parallel housing portion that is generally parallel to the longitudinal axis of the shaft, a radially extending housing portion that extends generally radially towards the longitudinal axis of the shaft, and a faceplate portion that extends generally radially towards the longitudinal axis of the shaft, the faceplate portion disposed axially outwardly of the radially extending sleeve portion relative to a lubricant side of the seal and including an axially inner surface generally facing the lubricant side;

a first elastomeric protrusion extending between the radially extending sleeve portion and the axially inner surface of the faceplate portion and including a base and an end generally opposite the base and oriented radially towards the longitudinal axis of the shaft; and a second elastomeric protrusion including a base secured to the housing and an end generally opposite the base, wherein the end is oriented generally radially away from the longitudinal axis of the shaft.

2. The seal of claim 1, wherein the base of the second elastomeric protrusion is secured to the radially extending housing portion.

3. The seal of claim 1, wherein the end of the second elastomeric protrusion is oriented generally both radially away from the longitudinal axis of the shaft and axially outward.

4. The seal of claim 1, further comprising a third elastomeric protrusion including a base secured to the housing and an end generally opposite the base.

5. The seal of claim 4, wherein the base of the third elastomeric protrusion is secured to the radially extending housing portion.

6. The seal of claim 4, wherein the end of the third elastomeric protrusion is oriented generally axially outward.

7. The seal of claim 4, wherein the end of the third elastomeric protrusion is oriented generally axially inward.

8. The seal of claim 4, further comprising a fourth elastomeric protrusion including a base secured to the housing and an end generally opposite the base.

9. The seal of claim 8, wherein the base of the fourth elastomeric protrusion is secured to the radially extending housing portion.

10. The seal of claim 8, wherein the end of the fourth elastomeric protrusion is oriented generally axially outward.

11. The seal of claim 8, wherein the end of the fourth elastomeric protrusion is oriented generally axially inward.

12. The seal of claim 8, further comprising a fifth elastomeric protrusion including a base secured to the housing and an end generally opposite the base.

13. The seal of claim 12, wherein the base of the fifth elastomeric protrusion is secured to the radially extending housing portion.

14. The seal of claim 12, wherein the end of the fifth elastomeric protrusion is oriented generally axially inward.

15. The seal of claim 12, further comprising a garter spring associated with the fifth elastomeric protrusion.

16. The seal of claim 1, further comprising a third elastomeric protrusion including a base secured to the radially extending sleeve portion and an end generally opposite the base, wherein the end is oriented both generally radially away from the longitudinal axis of the shaft and axially outward.

17. The seal of claim 1, wherein the end of the first elastomeric protrusion has a generally acute point.

18. The seal of claim 17, wherein the first elastomeric protrusion has an acute undercut angle.

19. The seal of claim 1, wherein the base of the first elastomeric protrusion is secured to the radially extending sleeve portion and the end of the first elastomeric protrusion is oriented both generally axially outward and radially towards the longitudinal axis of the shaft.

20. The seal of claim 1, wherein the first elastomeric protrusion is configured and oriented to guide inward traveling debris from the end of the first elastomeric protrusion towards the base of the first elastomeric protrusion.

21. The seal of claim 1, wherein said first elastomeric protrusion end contacts said axially inner surface of said faceplate.

22. A seal for sealing a shaft, the seal comprising:

a sleeve constructed to be disposed generally coaxially around the shaft and comprising a parallel sleeve portion that is generally parallel to the longitudinal axis of the shaft and a radially extending sleeve portion that extends generally radially away from the longitudinal axis of the shaft;

an outer housing configured to generally surround the sleeve and comprising a parallel housing portion that is generally parallel to the longitudinal axis of the shaft, a radially extending housing portion that extends generally radially towards the longitudinal axis of the shaft, and a faceplate portion that extends generally radially towards the longitudinal axis of the shaft, the faceplate portion disposed axially outwardly of the radially extending sleeve portion relative to a lubricant side of the seal and including an axially inner surface generally facing the lubricant side;

a first elastomeric protrusion extending between the radially extending sleeve portion and the axially inner surface of the faceplate portion and including a base and an end generally opposite the base and oriented radially towards the longitudinal axis of the shaft;

a second elastomeric protrusion extending generally between the housing and the radially extending sleeve portion and including a base and an end generally opposite the base and oriented generally radially away from the longitudinal axis of the shaft; and a third elastomeric protrusion including a base secured to the radially extending sleeve portion, wherein the end is oriented both generally radially away from the longitudinal axis of the shaft and axially outward.

23. The seal of claim 22, wherein the end of the first elastomeric protrusion has a generally acute point.

24. The seal of claim 23, wherein the first elastomeric protrusion has an acute undercut angle.

25. The seal of claim 22, wherein the base of the first elastomeric protrusion is secured to the radially extending sleeve portion and the end of the first elastomeric protrusion is oriented both generally axially outward and radially towards the longitudinal axis of the shaft.

26. The seal of claim 22, wherein the first elastomeric protrusion is configured and oriented to guide inward traveling debris from the end of the first elastomeric protrusion towards the base of the elastomeric protrusion.

27. The seal of claim 22, wherein the base of the second elastomeric protrusion is secured to the housing and the end of the second elastomeric lip is oriented both generally axially outward and radially away from the longitudinal axis of the shaft.

28. The seal of claim 27, wherein the base of the second elastomeric protrusion is secured to the radially extending housing portion.

29. The seal of claim 22, further comprising an elastomeric coating on an outer surface of the housing and/or an outer surface of the sleeve.

30. The seal of claim 22, wherein the faceplate portion comprises a parallel faceplate portion that is generally parallel to the longitudinal axis of the shaft, and a front cover portion that extends generally radially towards the longitudinal axis of the shaft from the parallel faceplate portion.

31. The seal of claim 30 wherein the faceplate portion further comprises a third portion that extends generally radially towards the longitudinal axis of the shaft from the parallel faceplate portion.

32. The seal of claim 22, further comprising a fourth elastomeric protrusion including a base secured to the housing and an end.

33. The seal of claim 32, wherein the base of the fourth elastomeric protrusion is secured to the radially extending housing portion.

34. The seal of claim 32, wherein the end of the fourth elastomeric protrusion is oriented generally axially outward.

35. The seal of claim 32, wherein the end of the fourth elastomeric protrusion is oriented generally axially inward.

36. The seal of claim 32, further comprising a fifth elastomeric protrusion including a base secured to the housing and an end.

37. The seal of claim 36, wherein the base of the fifth elastomeric protrusion is secured to the radially extending housing portion.

38. The seal of claim 36, wherein the end of the fifth elastomeric protrusion is oriented generally axially outward.

39. The seal of claim 36, wherein the end of the fifth elastomeric protrusion is oriented generally axially inward.

40. The seal of claim 36, further comprising a sixth elastomeric protrusion including a base secured to the housing and an end.

41. The seal of claim 40, wherein the base of the sixth elastomeric protrusion is secured to the radially extending housing portion.

42. The seal of claim 40, wherein the end of the sixth elastomeric protrusion is oriented generally axially inward.

43. The seal of claim 40, further comprising a garter spring associated with the sixth elastomeric protrusion.

44. The seal of claim 22, further comprising a fourth elastomeric protrusion including a base secured to the faceplate portion and an end oriented generally radially towards the longitudinal axis of the shaft.

45. The seal of claim 22, wherein said first elastomeric protrusion end contacts said axially inner surface of said faceplate.

* * * * *

UNITED STATES PATENT AND TRADEMARK OFFICE
CERTIFICATE OF CORRECTION

PATENT NO. : 7,159,871 B2 Page 1 of 1
APPLICATION NO. : 10/781175
DATED : January 9, 2007
INVENTOR(S) : Michael R. Oldenburg It is certified that error appears in the above-identified patent and that said Letters Patent is hereby corrected as shown below:

On The Title Page (73):

Please delete "Freudenberg-NOK General Partnership, Plymouth, MI" as the Assignee and insert --International Seal Company, Inc., Shakopee, MN--.

Signed and Sealed this

Eleventh Day of December, 2007

JON W. DUDAS
*Director of the United States Patent and Trademark Office*